United States Patent
Bryant et al.

(10) Patent No.: US 10,049,342 B2
(45) Date of Patent: Aug. 14, 2018

(54) METHOD AND APPARATUS PERTAINING TO SHARING CONTENT WITH SCHEDULED-EVENT PARTICIPANTS

(71) Applicant: BlackBerry Limited, Waterloo (CA)

(72) Inventors: Cody Stephen Bryant, Waterloo (CA); Orlin Vesselinov Stoev, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 13/916,951

(22) Filed: Jun. 13, 2013

(65) Prior Publication Data

US 2014/0372905 A1    Dec. 18, 2014

(51) Int. Cl.
*G06Q 10/10* (2012.01)
*H04M 1/725* (2006.01)

(52) U.S. Cl.
CPC ........ *G06Q 10/10* (2013.01); *H04M 1/72566* (2013.01)

(58) Field of Classification Search
CPC .............. G06F 17/248; G06F 17/2785; G06F 17/30761; G06F 9/4446
See application file for complete search history.

(56) References Cited

U.S. PATENT DOCUMENTS

| | | |
|---|---|---|
| 7,007,066 B1 | 2/2006 | Malik |
| 7,039,699 B1 | 5/2006 | Narin et al. |
| 8,286,085 B1 | 10/2012 | Denise |
| 2006/0106828 A1 | 5/2006 | Boss et al. |
| 2006/0150088 A1 | 7/2006 | Kraft et al. |
| 2008/0091504 A1* | 4/2008 | Lyle ................. G06Q 10/06311 705/7.19 |
| 2008/0133501 A1* | 6/2008 | Andersen .......... G06F 17/30867 |
| 2009/0100332 A1 | 4/2009 | Kanjilal et al. |
| 2009/0249244 A1* | 10/2009 | Robinson .............. G06F 3/0481 715/781 |
| 2010/0070877 A1 | 3/2010 | Scott et al. |
| 2011/0117898 A1* | 5/2011 | Pereira ................ H04L 12/5835 455/414.4 |
| 2011/0173337 A1* | 7/2011 | Walsh ................... H04W 4/023 709/229 |

(Continued)

FOREIGN PATENT DOCUMENTS

WO    2008/011549 A2    1/2008

OTHER PUBLICATIONS

Moltenbrey, Michael; Examiner; Extended European Search Report from related European Patent Application No. 13171927.0 dated Sep. 27, 2013; 6 pages.

(Continued)

*Primary Examiner* — Abdullah Al Kawsar
*Assistant Examiner* — David A Spellman
(74) *Attorney, Agent, or Firm* — Thomas Grzesik

(57) ABSTRACT

In one embodiment, an apparatus is configured to facilitate sharing a particular content item (such as, for example, a particular digital photograph, a video, a presentation, and so forth) with the participants of a scheduled calendar event (such as a face-to-face meeting, a distance meeting, an appointment, and so forth). By one approach the user is presented with an opportunity to assert a non-specific share command that triggers the aforementioned display of one or more recommended sharing actions.

20 Claims, 6 Drawing Sheets

(56) References Cited

U.S. PATENT DOCUMENTS

| | | | |
|---|---|---|---|
| 2011/0307399 A1* | 12/2011 | Holmes | G06Q 30/02 |
| | | | 705/319 |
| 2012/0010995 A1* | 1/2012 | Skirpa | G06F 3/0481 |
| | | | 705/14.49 |
| 2012/0131020 A1 | 5/2012 | Nitz et al. | |
| 2012/0284638 A1* | 11/2012 | Cutler | G06Q 10/00 |
| | | | 715/751 |
| 2013/0073584 A1 | 3/2013 | Kuper et al. | |
| 2013/0110925 A1* | 5/2013 | Wessling | G06Q 10/109 |
| | | | 709/204 |

OTHER PUBLICATIONS

European Examination Report dated Jun. 14, 2016, received for European Application No. 13171926.2.

* cited by examiner

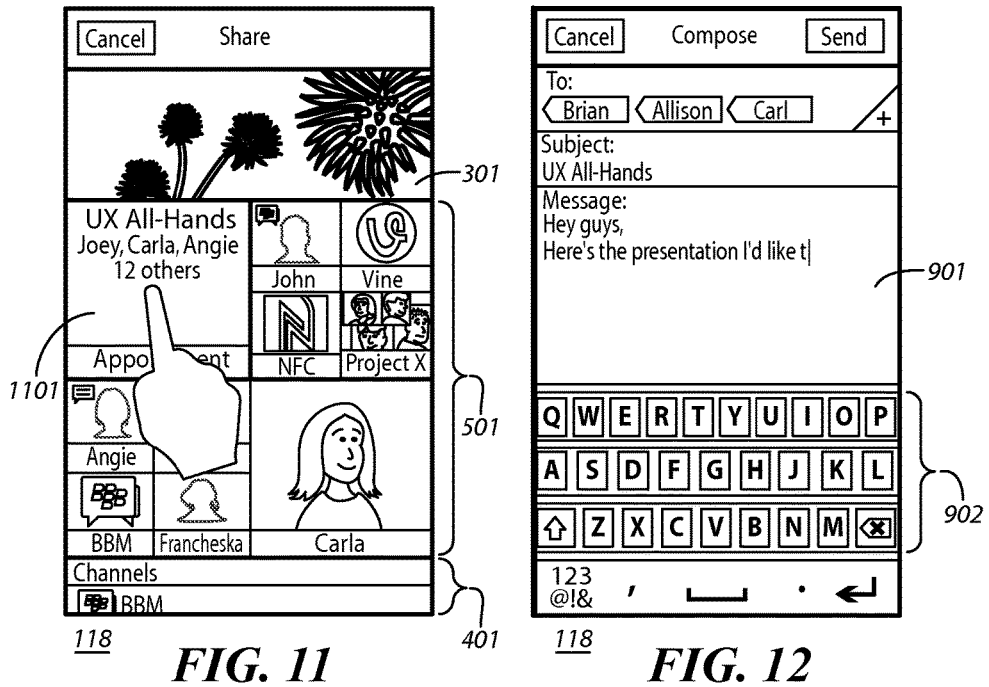
FIG. 11  FIG. 12
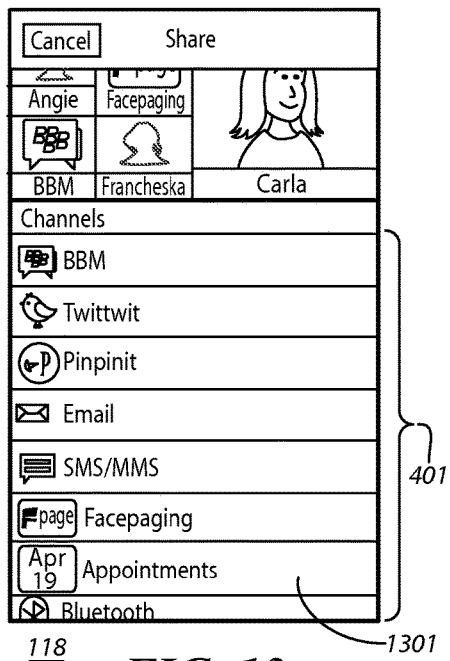
FIG. 13

METHOD AND APPARATUS PERTAINING TO SHARING CONTENT WITH SCHEDULED-EVENT PARTICIPANTS

RELATED APPLICATIONS

This application is related to co-pending and co-owned U.S. patent application Ser. No. 13/917,001, entitled METHOD AND APPARATUS PERTAINING TO HISTORY-BASED CONTENT-SHARING RECOMMENDATIONS and filed on even date herewith, which is incorporated by reference in its entirety herein.

FIELD OF TECHNOLOGY

The present disclosure relates to generally to electronic devices and more particularly to the electronic sharing of content items.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, so-called smart telephones, wireless personal digital assistants (PDAs), and laptop and tablet/pad-styled computers with wide-area, wireless 802.11, and/or Bluetooth capabilities.

Many electronic devices permit the user to obtain, access, and/or capture any of a variety of content items. (As used herein, "content items" will be understood to refer to consumable media such as digital photographs and other images, video (including audio-video) material, audio material, and textual material (with or without non-textual embellishment.) And, as many electronic devices have communications capabilities, these devices are also capable of sharing content items with other parties by transporting such content items to such parties.

In fact, many electronic devices will support any of a plurality of different sharing modalities. Examples include (but are not limited to) a variety of email services and messaging services, uploading and downloading services, and social networking-based services. Unfortunately, having access to a rich selection of sharing tools does not always lead to user satisfaction. Instead, at least some users under at least some operating circumstances can become frustrated due to confusion regarding which sharing modality to employ when looking to share a given content item.

In other cases users who may not suffer confusion can nevertheless become annoyed at the tedium and/or time sometimes associated with navigating and correctly executing the series of steps, menu-based selections, and so forth that can be associated with effectively using particular sharing approaches when sharing their content items.

BRIEF DESCRIPTION OF THE DRAWINGS

FIG. 11 is a screen shot in accordance with the disclosure.
FIG. 12 is a screen shot in accordance with the disclosure.
FIG. 13 is a screen shot in accordance with the disclosure.

DETAILED DESCRIPTION

Figure 1:
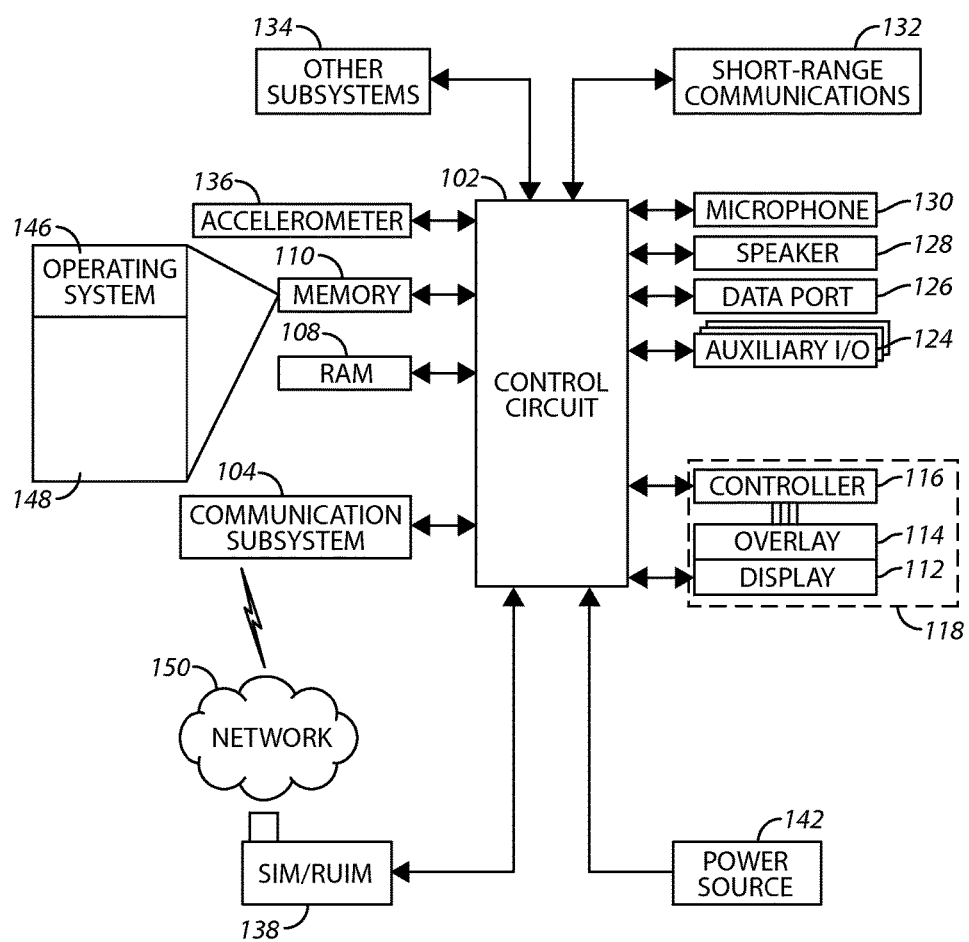
FIG. 1 is a block diagram in accordance with the disclosure.

The following describes an apparatus and method pertaining to sharing a particular content item (such as, for example, a particular digital photograph, a video, a Powerpoint™ presentation, and so forth) with the participants of a scheduled calendar event (such as a face-to-face meeting, a distance meeting, an appointment, and so forth).

By one approach the aforementioned apparatus comprises a portable communications device such as a so-called smartphone.

By one approach the apparatus presents this ability to share the content item with other event participants via a recommendation. This recommendation (and/or other recommended sharing actions) can be based, if desired, upon a corresponding sharing history. This sharing history can comprise, for example, previously-selected sharing actions as correlated to content item types. Useful examples of sharing history include, but are not limited to, previously-selected sharing actions regarding one or more of shared-content recipients, corresponding temporal data, shared-content size, corresponding location data, and so forth. By one approach the apparatus itself serves to automatically track user-based content-sharing selections over time, which information is stored as the aforementioned sharing history.

These teachings are highly flexible in practice and will accommodate a variety of modifications. As one illustrative example, while displaying at least a portion of a particular content item (such as a particular digital photograph), these teachings will accommodate providing the user with an opportunity to assert a non-specific share command corresponding to that displayed content item. Asserting this non-specific share command, in turn, can trigger the aforementioned display of an available sharing action by which the content item can be shared with other event participants.

These teachings will also support use with any of a variety of sharing actions. Examples include, but are not limited to, email-based sharing actions, social network-based sharing actions (such as Facebook™ and LinkedIn™), Twitter™-based sharing actions, Short Message Service (SMS)-based sharing actions, Multimedia Messaging Service (MMS)-based sharing actions, cloud-based sharing services (such as Picassa™, Flickr™, and Pinterest™), file uploading-based sharing services, and so forth.

These teachings can be economically deployed and are also highly scalable. Accordingly, these teachings can be readily employed with as many, or as few, sharing modalities as may be desired. Similarly, the aforementioned recommendations can be based upon only a few, or a great many, monitored sharing actions to develop the sharing history.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

These teachings can be carried out by any of a variety of enabling platforms. For the sake of an illustrative example but without intending any particular limitations in these regards, the description provided herein presumes the platform of choice to be a portable communications device. FIG. 1 presents one illustrative example in these regards.

This illustrative portable communication device includes a control circuit 102 that controls the overall operation of the portable electronic device. Such a control circuit 102 or processor can comprise a fixed-purpose hard-wired platform or can comprise a partially or wholly programmable platform. These architectural options are well known and understood in the art and require no further description here. This control circuit 102 is configured (for example, by using corresponding programming as will be well understood by those skilled in the art) to carry out one or more of the steps, actions, and/or functions described herein.

Corresponding communication functions, including data and voice communications, are performed through a communication subsystem 104. The communication subsystem receives messages from and sends messages to a wireless network 150. The wireless network 150 may be any type of wireless network, including, but not limited to, a wireless data networks, a wireless voice network, or a network that supports both voice and data communications.

The control circuit 102 may also operably couple to a short-range communication subsystem 132 (such as an 802.11 or 802.16—compatible transceiver and/or a Bluetooth™—compatible transceiver). To identify a subscriber for network access, the portable communication device may utilize a Subscriber Identity Module or a Removable User Identity Module (SIM/RUIM) card 138 for communication with a network, such as the wireless network 150. Alternatively, user identification information may be programmed into a memory 110.

A power source 142, such as one or more rechargeable batteries or a port to an external power supply, powers the electronic device. The control circuit 102 may interact with an accelerometer 136 that may be utilized to detect direction of gravitational forces or gravity-induced reaction forces. The control circuit 102 also interacts with a variety of other components, such as a Random Access Memory (RAM) 108, a memory 110, an auxiliary input/output (I/O) subsystem 124, a data port 126, a speaker 128, a microphone 130, and other device subsystems 134 of choice.

A display 112 can be disposed in conjunction with a touch-sensitive overlay 114 that operably couples to an electronic controller 116. Together these components can comprise a touch-sensitive display 118 that serves as a graphical-user interface. Information, such as text, characters, symbols, images, icons, and other items may be displayed on the touch-sensitive display 118 via the control circuit 102.

The touch-sensitive display 118 may employ any of a variety of corresponding technologies including but not limited to capacitive, resistive, infrared, surface acoustic wave (SAW), strain gauge, optical imaging, dispersive signal technology, and/or acoustic pulse recognition-based touch-sensing approaches as are known in the art. If the touch-sensitive display 118 should utilize a capacitive approach, for example, the touch-sensitive overlay 114 can comprise a capacitive touch-sensitive overlay 114. In such a case the overlay 114 may be an assembly of multiple stacked layers including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 118. The control circuit 102 may determine attributes of the touch, including a location of a touch. Touch location data may include data for an area of contact or data for a single point of contact, such as a point at or near a center of the area of contact. Generally speaking, a swipe is a touch that begins at one location on the touch-sensitive display 118 and ends at another location (as when the user places their fingertip on the touch-sensitive display 118 and then drags their fingertip along the surface of the touch-sensitive display 118 before finally lifting their fingertip from that surface).

The portable communication device includes an operating system 146 and software programs, applications (such as, but not limited to, a calendar application as is known in the art), or components 148 that are executed by the control circuit 102 and are typically stored in a persistent, updatable store such as the memory 110. Additional applications or programs may be loaded onto the portable communication device through the wireless network 150, the auxiliary I/O subsystem 124, the data port 126, the short-range communications subsystem 132, or any other suitable subsystem 134.

The memory 110 may comprise a non-transitory storage media that stores executable instructions which, when executed, causes one or more of the functions, steps, or actions described herein. In particular, this memory 110 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

As a communication device, a received signal such as a text message, an e-mail message, or web page download is processed by the communication subsystem and input to the control circuit 102. The control circuit 102 processes the received signal for output to the display 112 and/or to the auxiliary I/O subsystem 124. A user may generate data items, for example e-mail messages, that may be transmitted over the wireless network 150 through the communication subsystem. For voice communications, the overall operation of the portable communication device is similar. The speaker 128 outputs audible information converted from electrical signals, and the microphone 130 converts audible information into electrical signals for processing.

Other components may be provided, such as a positioning system or device (like a GPS device) for determining location. Also, one or more components may be combined or further separated.

The remainder of this description will presume to use the foregoing portable communication device as an enabling platform. That said, it will again be understood that no particular limitations are intended in those regards.

Figure 2:
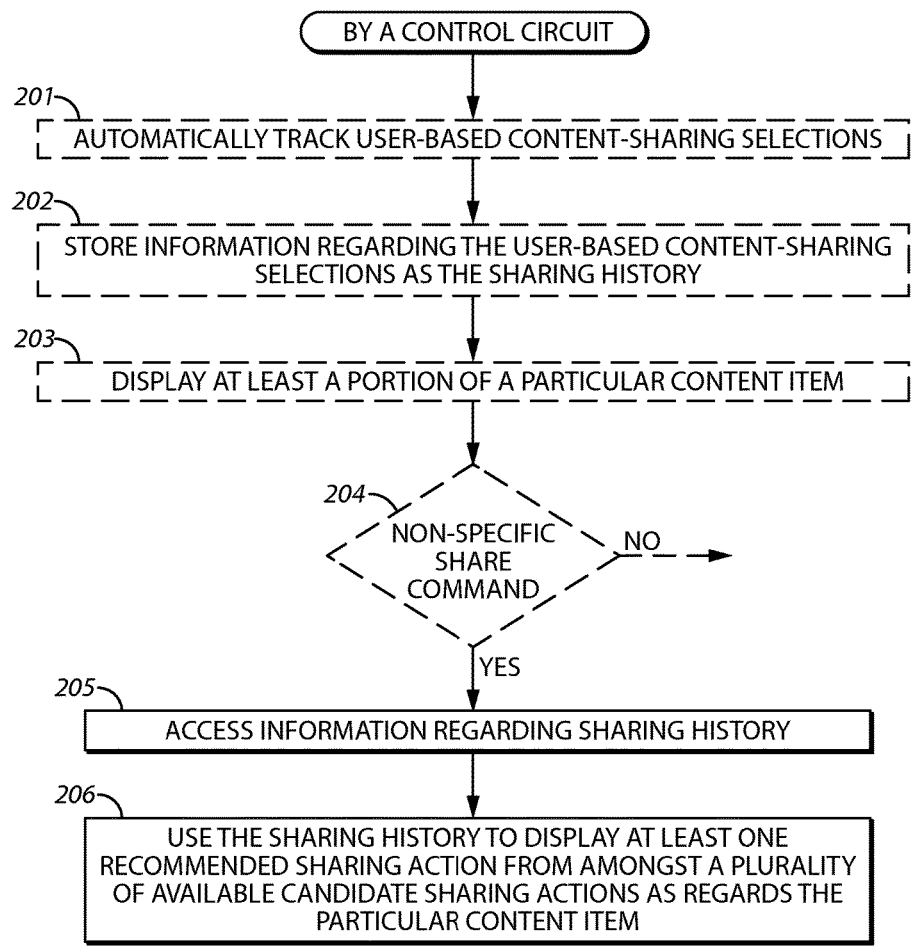
FIG. 2 is a flow diagram in accordance with the disclosure.

FIG. 2 presents a process 200 that can be carried out by the aforementioned control circuit 102 (using, for example, corresponding programming of the control circuit 102). This process 200 will accommodate a number of optional activities as denoted by the use of phantom lines for some of the actions. Fewer, more, or different activities/steps may be provided.

For example, at 201 and 202 the control circuit 102 can automatically track user-based content-sharing selections and store that information (for example, in the aforementioned memory 110) as a sharing history. By one approach, this can comprise noting and recording which sharing mechanisms (such as specific email services, SMS or MMS services, file-uploading and downloading drop box services, and social network services) the user chooses when sharing particular types of content items. By one approach these "types" can refer, for example, to file types such as .doc (text document), .jpg (picture or photo file), .pdf, .mp3 (audio file), spreadsheet file, video file, and so forth.

This tracking and storing activity can also comprise, in lieu of the foregoing or in combination therewith, one or more of: noting with which recipients (and which address/service for a given recipient) the user shares such content items; noting corresponding temporal data (such as the season or holiday, the month, the day of the week, and/or the time of day) to thereby correlate a tendency of the user to send one type of content item per one sharing behavior during, say, working hours and a tendency to send that same type of content item using a different sharing behavior during non-working hours; shared-content size to thereby correlate a tendency of the user to share a particular type of content item using one sharing behavior when the shared-content size is less than some predetermined amount (such as five megabytes or ten megabytes) and a different sharing behavior when the shared-content size is larger than that predetermined amount; and corresponding location data to thereby correlate, for example, a tendency of the user to share content items using one sharing behavior when the user is located at their office (regardless of the day or hour) and a different sharing behavior when the user is located elsewhere, to note but a few examples in these regards.

So configured, the user's device is itself able to establish, at least over time, a relevant history of a user's sharing behaviors. This history can be dynamically updated as the user's behavior confirms use of the recommendations provided by this process 200 and as the user evinces alternative behaviors.

These teachings will accommodate other approaches in these regards if desired, however. For example, by one approach the control circuit 102 tracks the user's content-sharing selections but then transmits that information to a remote platform where the tracking information serves to inform the remote creation and modification of a relevant sharing history. That remotely-derived sharing history can then be provided in its entirety to the control circuit 102 from time to time or, if desired, the control circuit 102 can query the remote platform at times of need to leverage the content of the remotely-stored sharing history.

As another example of an optional activity that this process 200 can support, at 203 the control circuit 102 can display at least a portion of a particular content item (as selected, for example, by the user). As will be illustrated by way of examples below, the aforementioned sharing history can be leveraged to inform the process of sharing the displayed content item. That said, however, it will be understood that the present teachings can be implemented without necessarily displaying the content item to be shared. For example, these teachings can be applied with respect to a displayed file or folder name or file icon for the content item to be shared.

At 204 this process 200 will also optionally provide for detecting when a user inputs a non-specific share command. This detection can comprise, for example, detecting a user's touch on a non-specific share button on a touch-sensitive display 118 as described above. As used herein, this reference to a "non-specific" share command will be understood to refer to a command to begin a sharing activity without yet specifying any particular sharing transport mechanism. An illustrative example in these regards appears further herein.

In the absence of detecting at 204 the non-specific share command this process 200 can accommodate any of a variety of responses. Examples of responses can include temporal multitasking (pursuant to which the portable communication device conducts other tasks before returning to again monitor for a non-specific share command) as well as continually looping back to essentially continuously monitor for this event. These teachings also accommodate supporting this detection activity via a real-time interrupt capability.

In any event, this process 200 then provides, at 205 and 206, for accessing information regarding a relevant sharing history and using that sharing history to display at least one recommended sharing action from amongst a plurality of available candidate sharing actions as regards a particular content item (such as, by one approach, a currently displayed particular content item as described above).

When the process 200 includes the activity of detecting a non-specific share command as described above, the activity of accessing the sharing history information can comprise an automatic response to detecting that non-specific share command. By another approach, such information can be automatically accessed (and one or more corresponding recommended sharing actions displayed) when the user selects to display or otherwise render a particular content item. The display can be opening the content for viewing and the render may be opening the content for listening. Also, the display can be viewing and/or highlighting a label, icon, reference, file name, or other item representing the specific content (without opening the content).

The particular use made of the sharing history can vary with the application setting and/or the needs of a given user. For example, the number, depth, and kind of correlations assessed and utilized can vary as desired. These teachings will also accommodate weighting different factors and informational items differently from one another if so desired.

FIGS. 3-9 provide various illustrative examples as regards the foregoing description. It will again be understood that no particular limitations are intended by way of the specificity of these examples.

Figure 3:
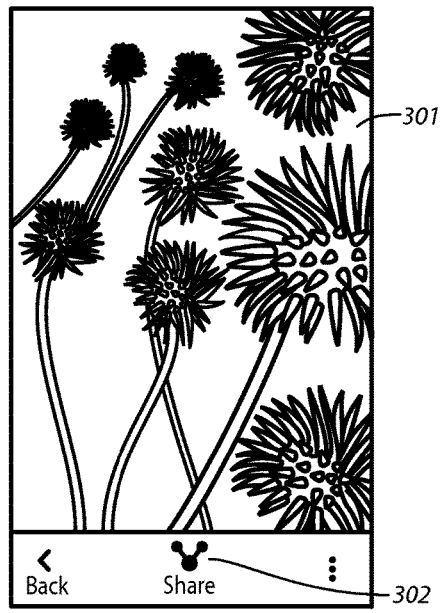
FIG. 3 is a screen shot in accordance with the disclosure.

FIG. 3 depicts the touch-sensitive display 118 of the above-described portable communication device. In this example the touch-sensitive display 118 displays a content item 301 comprising a digital photographic image. The bottom of the touch-sensitive display 118 also presents a non-specific share command icon 302. A user's tap on this non-specific share command icon 302 will permit the control circuit 102 to detect a corresponding non-specific share command as described above.

Figure 4:
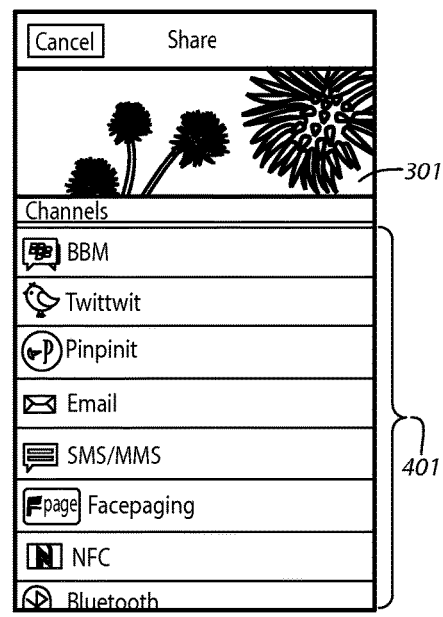
FIG. 4 is a screen shot in accordance with the disclosure.

As noted above, by one approach the portable communication device can track and develop a useful sharing history over time. Accordingly, the first time a user employs their device to share a content item there will be no sharing history yet developed. By way of an illustrative example, upon asserting the above-mentioned non-specific share command icon 301 a scrollable menu list of available candidate sharing approaches 401 is displayed as shown in FIG. 4. By one approach, and as illustrated, this list of available candidate sharing approaches 401 overlies only a portion of the content item 301. By this approach the user can easily keep in mind the content item they are presently about to share to help avoid confusion in these regards.

So configured, the user can select a particular candidate sharing approach to share the content item 301. The selections made in these regards are in turn tracked and stored as described above to build the sharing history.

These teachings are highly flexible in these regards and will accommodate essentially any content sharing approach. These figures provide a few non-exhaustive illustrative examples in these regards, such as the well-known BBM™ messaging service, a one-to-many message service (such as Twitter™) represented here by the fictional service Twit-Twit, a pinboard-style photo-sharing website (such as Pintererst™) represented here by the fictional service PinPinit, email (via any of a plurality of email service providers including the Yahoo™ email service, the Google™ email service, and so forth), SMS and/or MMS messaging services, a social-networking service (such as Facebook™) represented here by the fictional service Facepaging, a Near Field Communications (NFC) service, a Bluetooth™-based service, a video-clip sharing service such as Vine™, and so forth.

Figure 5:
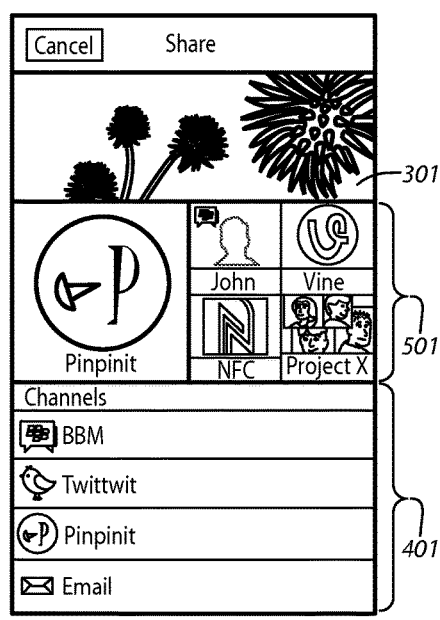
FIG. 5 is a screen shot in accordance with the disclosure.

As that sharing history develops the portable communication device is able to access and leverage that sharing history as described above to then develop and display one or more corresponding recommended sharing actions as appropriate. FIG. 5 offers an illustrative example in these regards. In addition to the scrollable list of available candidate sharing approaches 401 and a portion of the content item 301 the touch-sensitive display 118 now also presents a plurality of sharing action recommendations 501.

In this example these recommendations 501 each comprise a simple, intuitive icon that represents as appropriate a particular social network, email service, or message service, or even specific individuals or groups of individuals as appropriate. The relevant size of each recommendation icon can vary, if desired, with respect to any parameter of interest. For example, by one approach the size of the recommendation can vary as a function of the confidence that the control circuit 102 has with respect to the recommendation being a likely, preferred sharing action for this particular content item (taking all other parameters of interest into account). As another example the size of the recommendation icon can vary as a simple function of how frequently the user selects that sharing approach when sharing this type of content item (again possibly taking all other parameters of interest into account).

Figure 6:
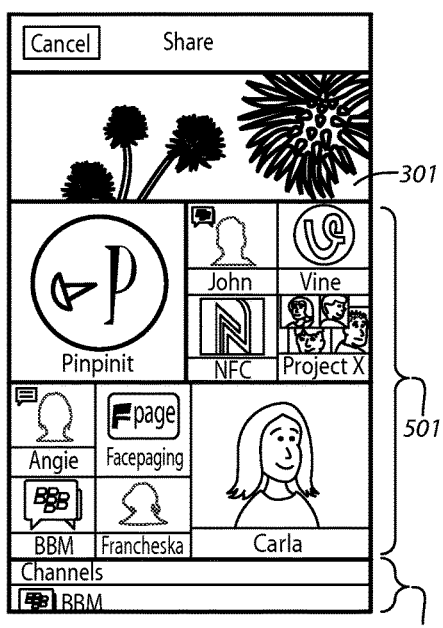
FIG. 6 is a screen shot in accordance with the disclosure.

As shown in FIG. 6, the area of the touch-sensitive display 118 devoted to the display of the recommendation icons 501 can itself be dynamically varied. Accordingly, as the number of useful recommendations may vary for a given type of content item and/or over time as the sharing history grows in size and complexity, the display space can increase, or decrease, to best accommodate a useful and ergonomic display of such content.

Figure 7:
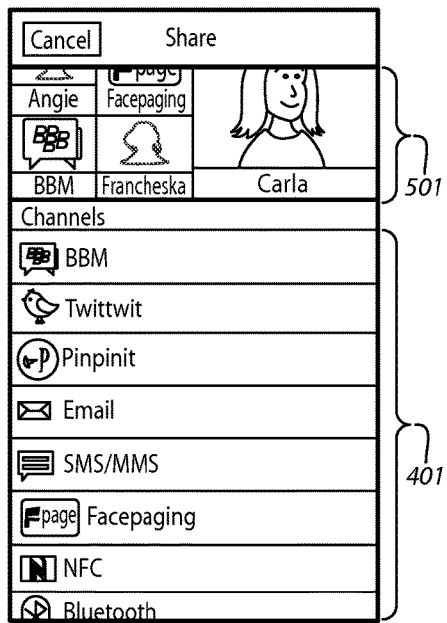
FIG. 7 is a screen shot in accordance with the disclosure.

By one approach, if desired, the display always includes at least a portion of the scrollable list of available candidate sharing actions 401 to thereby permit the user to access their sharing options via that approach. As illustrated in FIG. 7, upon selecting that scrollable list of available candidate sharing actions 401 the touch-sensitive display 118 can upwardly scroll the display of recommendation icons 501 to thereby provide additional room to better and more completely display the scrollable list of available candidate sharing actions 401.

Figure 8:
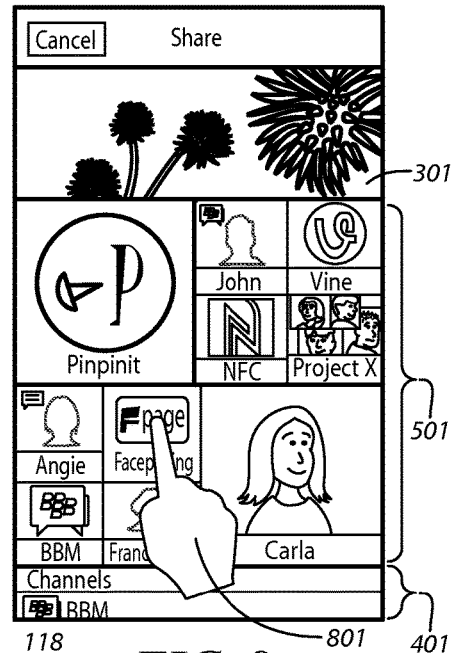
FIG. 8 is a screen shot in accordance with the disclosure.
Figure 9:
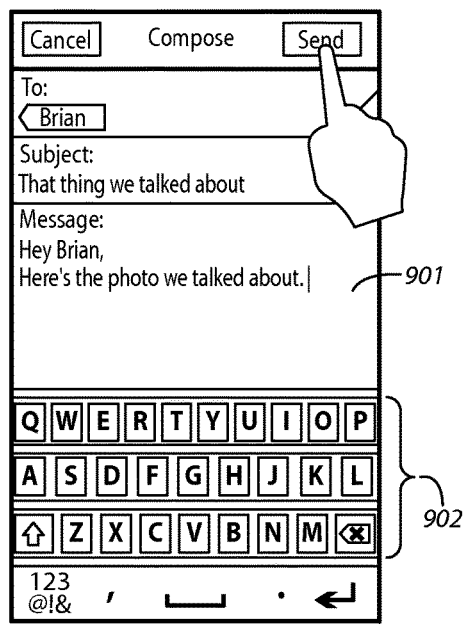
FIG. 9 is a screen shot in accordance with the disclosure.

As shown in FIG. 8, and by way of a further example, a user can easily select a particular recommended sharing action by simply tapping 801 or otherwise selecting the desired recommendation. Such a selection can then result in displaying a corresponding user interface for the selected sharing mechanism as suggested by the illustration shown in FIG. 9. In this particular example the user interface includes a text-entry window 901 and a virtual keyboard 902 to facilitate entering text in the text-entry window 901.

These teachings will readily accommodate pre-populating one or more fields and other selection opportunities when opening the selected content-sharing transport modality. This can comprise, for example, automatically inserting recipient addresses and/or names, subject field information (using, for example, the file name of the content item being shared), a name or signature block for the person sharing the content item, and so forth. These teachings will also provide for automatically attaching the content item to a message and/or inserting the content item into the message as appropriate. These teachings will also accommodate, as another example, providing a link that the recipient can select to direct their device to an on-line location where they can access and/or download the content item.

So configured, a user's device can develop one or more recommended sharing actions (including but not limited to recommendations regarding shared-content recipients and/or content-sharing transport modalities) for a given content item based, at least in part, upon a sharing history that is relevant to the user themselves. Using these approaches a user can more easily, quickly, and intuitively share content items than has been the typical user experience of the past.

These teachings will accommodate presenting some or all of the recommended sharing actions at any of a variety of times. By one approach, for example, the user can cause such recommendations to appear by asserting a general share button (or the like) as described above. By another approach, one or more such recommendations can be automatically displayed automatically when the user opens a given shareable content item in a particular previewer or viewer. Such an automated presentation can initially comprise, for example, a small window that the user can expand by, for example, tapping in that window. By another approach, in lieu of the foregoing or in combination therewith, the automated presentation of a recommended sharing action can be only temporarily displayed such that if the user does not assert a control feature within the recommendations the corresponding display of recommended sharing actions can be automatically removed.

Figure 10:
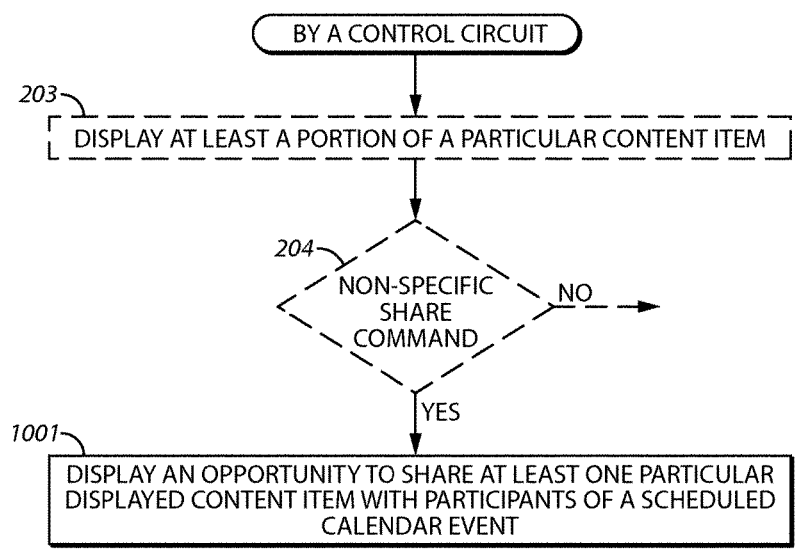
FIG. 10 is a flow diagram in accordance with the disclosure.

FIG. 10 presents a process 1000 that further illustrates the flexibility of these teachings. Here, as above, the process 1000 will again optionally accommodate such activities as displaying (at 203) at least a portion of a particular content item and/or detecting (at 204) a user's non-specific share command. This process 1000 also provides, at 1001, for displaying an opportunity to share a particular content item (such as a presently-displayed content item) with the participants of a scheduled calendar event. Fewer, more or different activities/steps may be provided.

Many electronic devices include one or more calendars (such as Outlook™) that serve, at least in part, to track scheduled events such as meetings, appointments, and so forth. In many cases a scheduled meeting (which may comprise an in-person meeting and/or a distance meeting such as a conference call or an on-line web meeting) has associated therewith the names and/or contact information for the corresponding meeting participants.

Accordingly, as one illustrative example in these regards, if a user is viewing a particular content item (such as a particular image, Powerpoint presentation, pdf document, spreadsheet, and so forth) at the same time as when an event is scheduled on their calendar, these teachings will provide for presenting that user with an opportunity to share that particular content item with the participants of that event. By one approach the presentation of such an opportunity can be limited to the scheduled start and stop times of the event. By another approach the opportunity window can be extended to include a period of time (such as five or ten minutes) prior to the scheduled beginning of the event and/or following the scheduled conclusion of the event.

By one approach, the process 1000 provides for displaying only this one sharing opportunity under these circumstances. By another approach, however, the process 100 provides for displaying the opportunity to share this particular content item with the participants of the scheduled calendar event in common with at least one other recommended sharing action as regards this content item. Accordingly, the process of FIG. 10 can be carried out in combination with, or in lieu of, the process 200 shown in FIG. 2.

FIGS. 11-13 offer some specific illustrative examples in these regards (where again no specific limitations are intended by way of the specificity of these examples).

In FIG. 11 the user has asserted a non-specific share command (as described above) via the device's user interface (in this example, the touch-sensitive display 118) while displaying a particular content item 301. Since the described assertion occurs during a relevant window of time as corresponds to a scheduled event that appears in the calendar of this device, the list of recommended sharing actions 501 includes an icon/button 1101 that represents the aforementioned opportunity to share the content item 301 with the participants of that current scheduled calendar event.

Selecting that icon/button 1101 then opens, in this example, an email-creation window as shown in FIG. 12 that is pre-addressed to the participants of the scheduled calendar event and that includes a text-entry window 901 and a virtual keyboard 902 as described above. This email-creation window also has the particular content item 301 pre-attached thereto and the subject line prepopulated with appropriate content (which can comprise, for example, a reference to the meeting itself (such as the name of the meeting) and/or the file name of the particular content item 301).

As noted above, these teachings will also provide a scrollable list of available candidate sharing approaches 401. As shown in FIG. 13, these teachings will accommodate having that list 401 include an opportunity 1301 to view all or part of the user's calendar. Using this approach, the user can select this opportunity 1301 to browse and select a particular scheduled event from their calendar (which can include a past (i.e., already completed) event, a current event, or a yet-to-be-conducted event). Upon selecting a scheduled event from the calendar, these teachings can then provide for an appropriate follow-on sharing mechanism (which can comprise, for example, opening a new email as shown in FIG. 12 that includes the addresses for the scheduled participants and other information pre-populated in the appropriate corresponding fields and windows).

These teachings provide a variety of ways by which a user can more easily, accurately, and appropriately share a variety of content item types. In many cases the ability of these teachings to best serve the needs of a given user improve over time as well.

The present disclosure may be embodied in other specific forms without departing from its essential characteristics.

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
a memory;
a user interface;
a control circuit operably coupled to the memory and the user interface, the control circuit to:
detect that at least one particular content item is being viewed by a user;
in response to the detection of the at least one particular content item being viewed by the user, access a set of calendar information from at least one electronic calendar associated with the user, where the at least one particular content item is being viewed independent of the at least one electronic calendar, wherein the accessing of the at least one electronic calendar is performed without receiving input from the user associated with the set of calendar information, and
wherein the set of calendar information comprises
temporal data for one or more calendar events identified by the at least one electronic calendar, and
an identification of at least one participant of at least one of the one or more calendar events;
in response to the set of calendar information being accessed, detect that at least one of the one or more calendar events is currently scheduled for a time period within a determined interval before, during or after the time at which the at least one particular content item is currently being viewed based on the temporal data for the one or more calendar events, wherein detecting that the at least one of the one or more calendar events is currently scheduled for the time period is performed without receiving any user input associated with the one or more calendar events;
in response to detecting that one or more calendar events is currently scheduled for a time period within a determined interval before, during or after the time at which the at least one particular content item is currently being viewed, automatically select the at least one participant of the at least one of the one or more calendar events as a recipient for at least one opportunity to share the detected at least one particular content item based on the at least one of the one or more calendar events being currently scheduled for the time period corresponding to the time at which the at least one particular content item is currently being viewed, wherein the at least one participant is automatically selected without receiving input from the user associated with the at least one opportunity to share; and
after automatically selecting the at least one participant and while the user is currently viewing the detected at least one particular content item, display the at least one opportunity to share the detected at least one particular content item based on detecting that at least one of the one or more calendar events is currently scheduled for the time period and the at least one participant having been automatically selected as a recipient, wherein the opportunity to share is a selectable icon configured to automatically populate a message for sharing the detected at least one particular content item with a unique identifier of the at least one participant; and in response to selecting the icon, populate the message for sharing with the unique identifier of the at least one participant and share the at least one particular content item with the at least one participant.

2. The apparatus of claim 1 wherein the apparatus comprises a portable communications device.

3. The apparatus of claim 1 wherein the control circuit is further to:
detect, via the user interface and with respect to the detected at least one particular content item, a user's non-specific share command; and
wherein the control circuit is further to display the opportunity to share the detected at least one particular content item in response to detecting the user's non-specific share command.

4. The apparatus of claim 3 wherein the control circuit is to detect the user's non-specific share command when displaying at least a portion of the detected at least one particular content item.

5. The apparatus of claim 1 wherein the control circuit is to display the opportunity to share with the at least one participant by displaying the opportunity to share the detected at least one particular content item with the unique identifier of the at least one participant.

6. The apparatus of claim 1 wherein the control circuit is to display the opportunity to share the detected at least one particular content item in common with an opportunity to generally browse scheduled calendar events.

7. The apparatus of claim 1 wherein the control circuit is to display the opportunity to share in common with at least one other recommended sharing action as regards to the detected at least one particular content item.

8. The apparatus of claim 7 wherein the at least one other recommended sharing action is based, at least in part, upon a content-sharing history.

9. The apparatus of claim 1 wherein the opportunity to share comprises an opportunity to email the detected at least one particular content item to the at least one participant.

10. The apparatus of claim 9 wherein the opportunity to email the detected at least one particular content item comprises an opportunity to automatically populate an email recipients field with an email address of the at least one participant and an email subject field with a calendar event name as corresponds to the one or more calendar events.

11. A method comprising:
detecting that at least one particular content item is being viewed by a user;
in response to detecting that the at least one particular content item is being viewed by the user,
accessing a set of calendar information from at least one electronic calendar associated with the user, where the at least one particular content item is being viewed independent of the at least one electronic calendar, wherein the accessing of the at least one electronic calendar is performed without receiving input from the user associated with the set of calendar information, and
wherein the set of calendar information comprises
temporal data for one or more calendar events identified by the at least one electronic calendar, and
an identification of at least one participant of the one or more calendar events;
in response to the set of calendar information being accessed and based on the temporal data for the one or more calendar events, detecting that at least one of the one or more calendar events is currently scheduled for a time period within a determined interval before, during or after the time at which the at least one particular content item is currently being viewed, wherein detecting that the at least one of the one or more calendar events is currently scheduled for the time period is performed without receiving any user input associated with the one or more calendar events;
in response to detecting that one or more calendar events is currently scheduled for a time period within a determined interval before, during or after the time at which the at least one particular content item is currently being viewed, automatically selecting the at least one participant of the at least one of the one or more calendar events as a recipient for at least one opportunity to share the detected at least one particular content item based on the at least one of the one or more calendar events being currently scheduled for the time period corresponding to the time at which the at least one particular content item is currently being viewed; and
after automatically selecting the at least one participant and while the user is currently viewing the detected at least one particular content item, displaying the at least one opportunity to share the detected at least one particular content item based on detecting that at least one of the one or more calendar events is currently scheduled for the time period and the at least one participant having been automatically selected as a recipient, wherein the at least one opportunity to share is a selectable icon configured to electronically share the at least one particular content item with the at least one participant using a sharing transport mechanism identified in the historical sharing data for the sharing action; and
in response to selecting the icon, share the at least one particular content item with the at least one participant using the sharing transport mechanism identified in the historical sharing data for the sharing action.

12. The method of claim 11 further comprising:
detecting, via a user interface and with respect to the detected at least one particular displayed content item, a user's non-specific share command; and
wherein displaying the opportunity to share the detected at least one particular content item comprises displaying the opportunity to share the at least one particular content item in response to detecting the user's non-specific share command.

13. The method of claim 12 wherein detecting, via a user interface and with respect to the detected at least one particular content item, a user's non-specific share command comprises detecting the user's non-specific share command while displaying at least a portion of the detected at least one particular content item.

14. The method of claim 11 wherein displaying the opportunity to share comprises displaying the opportunity to share the detected at least one particular content item with an identification of the at least one participant.

15. The method of claim 11 wherein displaying the opportunity to share comprises displaying the opportunity to share the detected at least one particular content item with participants of a currently scheduled calendar event in common with an opportunity to generally browse scheduled calendar events.

16. The method of claim 11 wherein displaying the opportunity to share comprises displaying the opportunity to share in common with at least one other recommended sharing action as regards to the detected at least one particular content item.

17. The method of claim 16 wherein displaying the opportunity to share in common with at least one other recommended sharing action comprises displaying the opportunity to share in common with a plurality of other recommended sharing actions.

18. The method of claim 17 wherein the plurality of other recommended sharing actions include email, a one-to-many message service, a pinboard-style photo-sharing website, SMS, MMS, a social-networking service, a Near Field Communications (NFC) service, a Bluetooth™-based service, and a video-clip sharing service.

19. The method of claim 11 wherein the opportunity to share comprises an opportunity to email the detected at least one particular content item to the at least one participant.

20. The method of claim 19 wherein the opportunity to email the detected at least one particular content item comprises an opportunity to automatically populate an email recipients field with an email address of the at least one participant and an email subject field with a calendar event name as corresponds to the one or more calendar events.

* * * * *